US011366757B2

(12) United States Patent
Fang et al.

(10) Patent No.: US 11,366,757 B2
(45) Date of Patent: Jun. 21, 2022

(54) FILE PRE-FETCH SCHEDULING FOR CACHE MEMORY TO REDUCE LATENCY

(71) Applicant: INTEL CORPORATION, Santa Clara, CA (US)

(72) Inventors: Liang Fang, Shanghai (CN); Zhen Zhou, Shanghai (CN)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 16/649,713

(22) PCT Filed: Nov. 22, 2017

(86) PCT No.: PCT/CN2017/112360
§ 371 (c)(1),
(2) Date: Mar. 23, 2020

(87) PCT Pub. No.: WO2019/100263
PCT Pub. Date: May 31, 2019

(65) Prior Publication Data
US 2020/0257628 A1   Aug. 13, 2020

(51) Int. Cl.
*G06F 12/00* (2006.01)
*G06F 12/0862* (2016.01)
(Continued)

(52) U.S. Cl.
CPC ...... *G06F 12/0862* (2013.01); *G06F 9/30047* (2013.01); *G06F 9/442* (2013.01);
(Continued)

(58) Field of Classification Search
CPC .............. G06F 12/0862; G06F 16/162; G06F 16/1734; G06F 9/30047; G06F 9/4406;
(Continued)

(56) References Cited

U.S. PATENT DOCUMENTS 7,865,536 B1 * 1/2011 Ghemawat .......... H04L 67/1095
707/819
8,433,694 B1   4/2013 Eldridge
(Continued)

FOREIGN PATENT DOCUMENTS

| EP | 3037960 A1 | 6/2016 |
| WO | 2015169212 A1 | 11/2015 |
| WO | 2019100263 A1 | 5/2019 |

OTHER PUBLICATIONS

International Search Report and Written Opinion received for PCT Application No. PCT/CN2017/112360, dated Aug. 17, 2018. 11 pages.
(Continued)

*Primary Examiner* — Gurtej Bansal
(74) *Attorney, Agent, or Firm* — 2SPL Patent Attorneys PartG mbB; Kieran O'Leary

(57) ABSTRACT

Techniques are provided for the scheduling of file prefetches from a file system into a cache memory, to reduce subsequent latency associated with future accesses to those files. A methodology implementing the techniques according to an embodiment includes monitoring accesses to files of the file system (e.g., file open and file read operations) and maintaining a record for each of the accessed files. The record includes an identifier of the file, the number of accesses of the file, and the number of cache memory misses associated with those accesses. The method also includes storing the record into a file access history database (FAHD). The method further includes generating, in response to an Operating System (OS) shutdown, a frequently used file list (FUFL) based on the FAHD. The method further includes pre-fetching files identified by a selected subset of the FUFL to the cache memory during an OS boot.

20 Claims, 8 Drawing Sheets

(51) Int. Cl.
  *G06F 16/16*     (2019.01)
  *G06F 16/17*     (2019.01)
  *G06F 9/30*      (2018.01)
  *G06F 9/4401*    (2018.01)
  *G06F 12/123*    (2016.01)

(52) U.S. Cl.
  CPC .......... *G06F 9/4406* (2013.01); *G06F 12/123* (2013.01); *G06F 16/162* (2019.01); *G06F 16/1734* (2019.01); *G06F 2212/1021* (2013.01); *G06F 2212/6024* (2013.01)

(58) Field of Classification Search
  CPC .................. G06F 9/442; G06F 12/123; G06F 2212/1021; G06F 2212/6024
  See application file for complete search history.

(56) References Cited

U.S. PATENT DOCUMENTS

| | | | |
|---|---|---|---|
| 2011/0225412 A1* | 9/2011 | Van De Ven | G06F 12/0862 713/2 |
| 2012/0011313 A1* | 1/2012 | Kopylovitz | G06F 3/064 711/113 |
| 2014/0129814 A1 | 5/2014 | Bi et al. | |
| 2015/0193463 A1 | 7/2015 | Merriman et al. | |
| 2016/0162409 A1* | 6/2016 | Kim | G06F 9/4401 711/137 |
| 2018/0329712 A1* | 11/2018 | Palani | G06F 12/0868 |
| 2019/0100263 A1 | 4/2019 | Amino et al. | |

OTHER PUBLICATIONS

International Preliminary Report on Patentability received for PCT Application No. PCT/CN2017/112360, dated Jun. 4, 2020. 5 pages.

\* cited by examiner

FILE PRE-FETCH SCHEDULING FOR CACHE MEMORY TO REDUCE LATENCY

BACKGROUND

Computing platforms often include some form of cache memory which acts as an interface between relatively fast memory that is close to the processor, and larger/slower storage systems, such as hard disk drives that are further removed from the processor. Although these cache memory systems are typically small in comparison to other memory systems on the platform, they can store some quantity of frequently used data, so that it is available to the processor with reduced latency compared, for example, to the time it would take to fetch the data from a disk drive. In general, however, it can be difficult to determine which data should be stored in the cache memory, and some existing techniques rely on users and/or software vendors to provide this information.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts.

Figure 1:
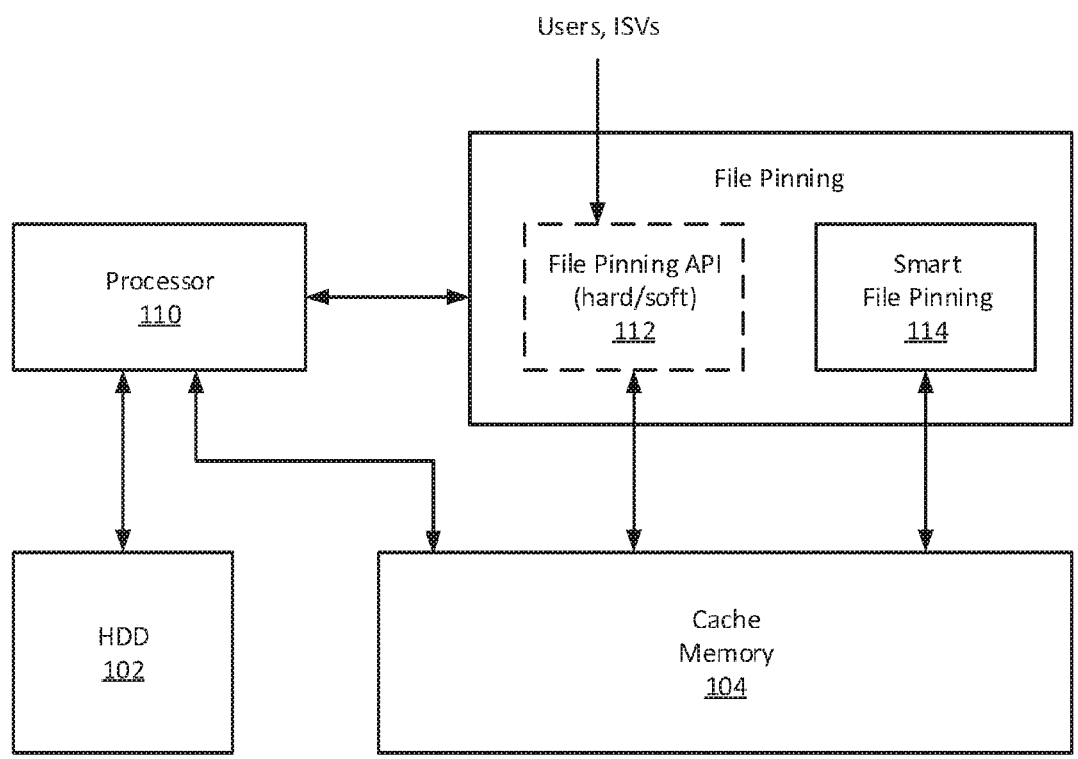
FIG. 1 is a top-level block diagram of an implementation of a file pre-fetch scheduling system on a computing platform, in accordance with certain embodiments of the present disclosure.

Although the following Detailed Description will proceed with reference being made to illustrative embodiments, many alternatives, modifications, and variations thereof will be apparent in light of this disclosure.

DETAILED DESCRIPTION

Generally, this disclosure describes techniques for the scheduling of file pre-fetches from a file system to a cache memory to reduce subsequent latency associated with future accesses to those files by a processor. The cache memory serves as an interface or buffer between the relatively fast memory that is close to the processor (e.g. random-access memory or RAM) and the larger but slower file storage systems, (e.g., hard disk drives) that are further removed from the processor. According to an embodiment, the identification of the files to be pre-fetched from the file system to the cache is based on a frequently used file list that is generated in an automated fashion from a history of file accesses and cache misses over a selected period of time. These identified files are transferred from the file system to the cache memory during boot up of the operating system (OS). The disclosed technique is also referred to herein as "smart file pinning," in contrast to "hard file pinning," in which the user specifies files to be stored in the memory cache, and "soft file pinning," in which software vendors specify files (associated with their applications) to be stored in the memory cache.

The disclosed techniques can be implemented, for example, in a computing system or a software product executable or otherwise controllable by such systems, although other embodiments will be apparent. In some embodiments, the system or product is configured to perform scheduling of file pre-fetches from a file system to a cache memory. In accordance with an embodiment, a process or methodology to implement these techniques includes monitoring accesses to files of the file system (e.g., file open and file read operations) and maintaining a record for each of the accessed files. In some embodiments, the record includes an identifier of the file, the number of accesses of the file, and the number of cache memory misses associated with those accesses over a selected period of time such as a user login/logout cycle. The method also includes storing the record into a file access history database (FAHD). The method further includes generating, in response to an OS shutdown, a frequently used file list (FUFL) based on the FAHD. The FUFL is sorted based on a combination of accesses and cache misses. The method further includes pre-fetching files, identified by a selected subset of the sorted FUFL, to the cache memory during an OS boot.

As will be appreciated, the techniques described herein may allow for improved identification of files to be pre-fetched from a filesystem to the cache memory, compared to existing methods that rely on identification of such files by the user and/or the software application vendors, which can be burdensome, error prone, and unreliable. For example, users may be unaware of these existing methods or may make poor file selection decisions that adversely impact memory cache performance. Additionally, software vendors may be reluctant to modify and update their code to specify frequently used files to the system (e.g., through a provided application programming interface).

The disclosed techniques can be implemented on a broad range of platforms including server systems, workstations, personal computers, laptops, tablets, and other such devices. These techniques may further be implemented in hardware or software or a combination thereof.

FIG. 1 is a top-level block diagram 100 of an implementation of a file pre-fetch scheduling system on a computing platform, in accordance with certain embodiments of the present disclosure. The system is shown to include a processor 110, a smart file pinning system 114, an optional hard/soft file pinning application programming interface (API) 112, a hard disk drive (HDD) 102, and a cache memory 104.

At a high level, the smart file pinning system is configured to provide automated identification of frequently used files that can benefit from storage in the cache memory to provide reduced latency before the user requests the file. This is accomplished using data collected from file usage monitoring performed prior to the most recent OS boot, enabling tracking of relatively longer-term trends in file usage, as will be explained in greater detail below. The smart file pinning techniques disclosed herein can be used in combination with traditional hard file pinning and soft file pinning techniques. As such, an optional file pinning API 112 may be provided to enable the user to specify files that should be stored in the memory cache (e.g., hard file pinning), and to enable independent software vendors (ISVs) to specify files that should be stored in the memory cache (e.g., soft file pinning).

Figure 2:
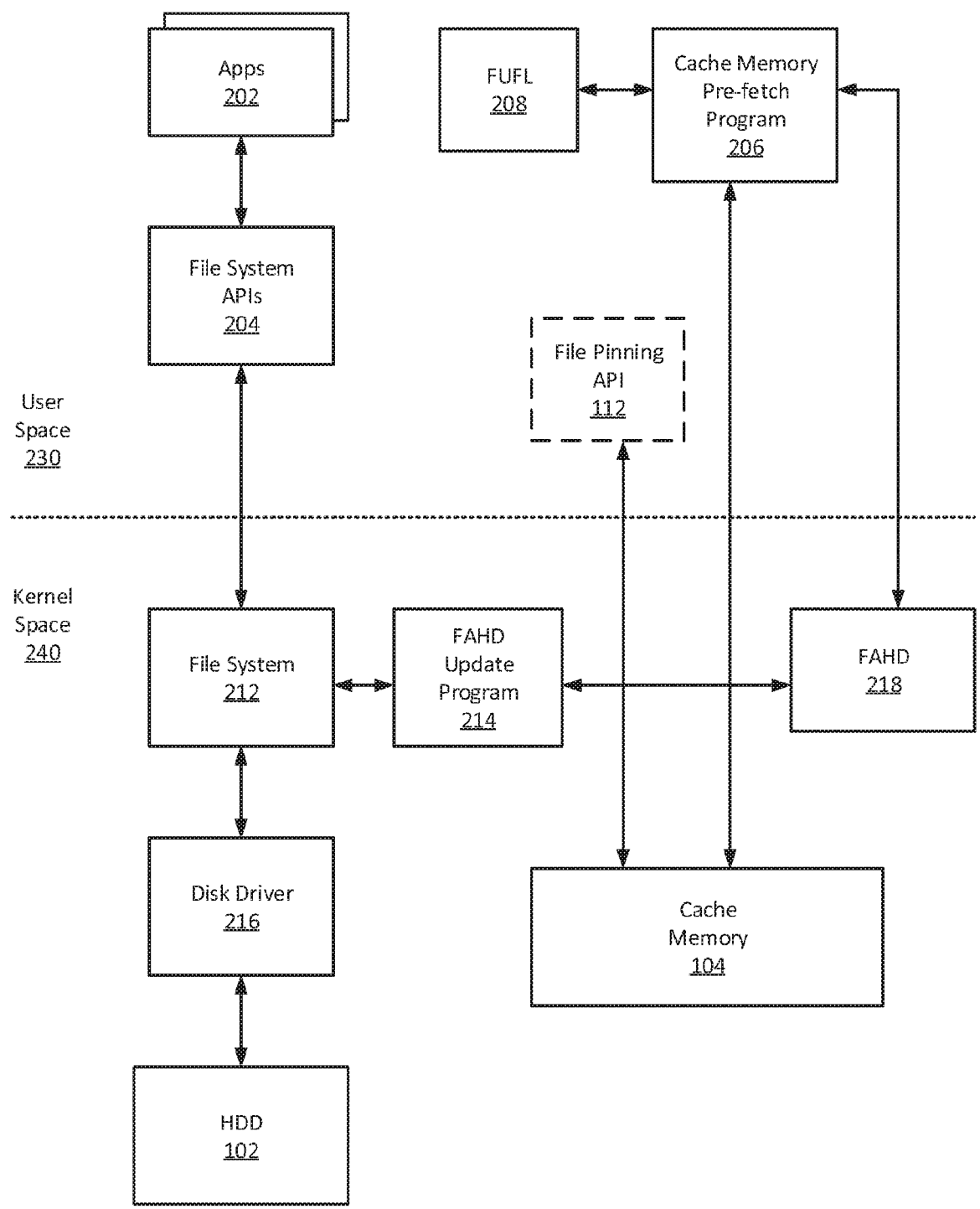
FIG. 2 is a more detailed block diagram of the file pre-fetch scheduling system, in accordance with certain embodiments of the present disclosure.

FIG. 2 is a more detailed block diagram 200 of the file pre-fetch scheduling system, in accordance with certain embodiments of the present disclosure. The system is shown to include any number of software applications 202 which interact with file system 212 through file system APIs 204. The file system 212 is stored, in this example, on a hard disk drive (HDD) 102 which is accessed through disk driver 216. So, for example, as the software applications execute they will typically access files from the file system that are stored on the HDD.

The system is also shown to include a cache memory pre-fetch program 206 configured to generate the FUFL 208 and to perform the file pre-fetching from the file system 212 to the cache memory 104, as will be explained below. The system is further shown to include an FAHD update program 214 to generate and maintain the FAHD 218, as will also be explained below.

The smart file pinning module 114, shown in FIG. 1, comprises the cache memory pre-fetch program 206, the FAHD update program 214, the FUFL 208, and the FAHD 218. In some embodiments, the system is divided into a user space 230 and a kernel space 240, the kernel space allowing for generally higher privilege levels than the user space.

The FAHD update program 214 is configured to monitor accesses to files of the file system and to create and maintain a record for each of the accessed files. File accesses, for the purposes of the FAHD update program, include file opens and file reads. The record includes an identifier of the file, a number of accesses of the file, and a number of cache memory misses associated with those file accesses. The record may capture file accesses and cache memory misses for a number of "rounds," each round associated with a selected period of time, such as, for example a given number of user login/logout cycles or other selected sequence of events or durations. FAHD update program 214 is further configured to store the record into the FAHD. If the file is later deleted from the file system, the associated record of that file in the FAHD may also be deleted. The content and format of the FAHD 218 is described in greater detail below, in connection with FIG. 3.

The cache memory pre-fetch program 206 is configured to detect an OS shutdown and, in response to that shutdown, generate a FUFL based on the records stored in the FAHD. In some embodiments, file IDs from the FAHD are stored into FUFL in a sorted order. The sorting may be performed using the number of accesses of the file as a major sorting key and using the number of cache memory misses as a minor sorting key. The sorting may be performed in any order that is most convenient, for example ascending or descending order. In some embodiments, a selected subset of the sorted list, for example the top 1000 accessed files, may be retained in the FUFL. That is to say, the top 1000 entries of the FUFL would be retained if the FUFL were sorted in descending order or the bottom 1000 entries would be retained if the FUFL were sorted in ascending order. Thus, the FUFL may be configured to include those files associated with the greatest number of accesses and the greatest number of cache memory misses. In some embodiments, the sorting of the FUFL can be weighted between accesses and cache memory misses in any desired manner. In some embodiments, the sorting of the FUFL may also be weighted by the size of the files. For example, it may be desirable not to pre-fetch a particularly large file that could consume a relatively large portion of the cache memory.

In some embodiments, cache memory pre-fetch program 206 is further configured to pre-fetch the files that are identified by the FUFL, or some portion thereof, from the file system to the cache memory, during or shortly after an OS boot. The FUFL may be deleted after the pre-fetch is completed. The pre-fetched files may then be accessed by the processor with reduced latency compared to files that reside solely on the HDD file system.

Figure 3:
FIG. 3 illustrates an example format of a file access history database (FAHD), in accordance with certain embodiments of the present disclosure.

FIG. 3 illustrates an example format of a file access history database (FAHD) 218, in accordance with certain embodiments of the present disclosure. Each row entry 300 in the table is associated with a file. For each file, a file ID 302, which uniquely identifies the file, is recorded. Also recorded for that file are the number of file system accesses and the number of cache memory misses, in columns R1 304, R2 306, and R3 308. Column R1 represents a first round of file accesses associated with a selected time duration, such as, for example the period between a user login and logout. Columns R2 and R3 represent second and third rounds of file accesses, for example from the two, prior user login/logout cycles. In some embodiments, more than 3 rounds or less than 3 rounds of data may be collected and stored. In some embodiments, the time durations for each round may be associated with other suitable events or may be set to any desired durations.

In some embodiments, the rounds may be stored as a circular buffer. For example, after column R3 is written, the system cycles back to column R1 and overwrites the old data in that column with new data. In some embodiments, the data from the 3 rounds may be summed to provide a summation of the number of accesses and a summation of the number of cache misses for use in the sorting. It will be appreciated that other file formats are possible and that any suitable format which provides the information described above, may be used.

Methodology

Figure 4:
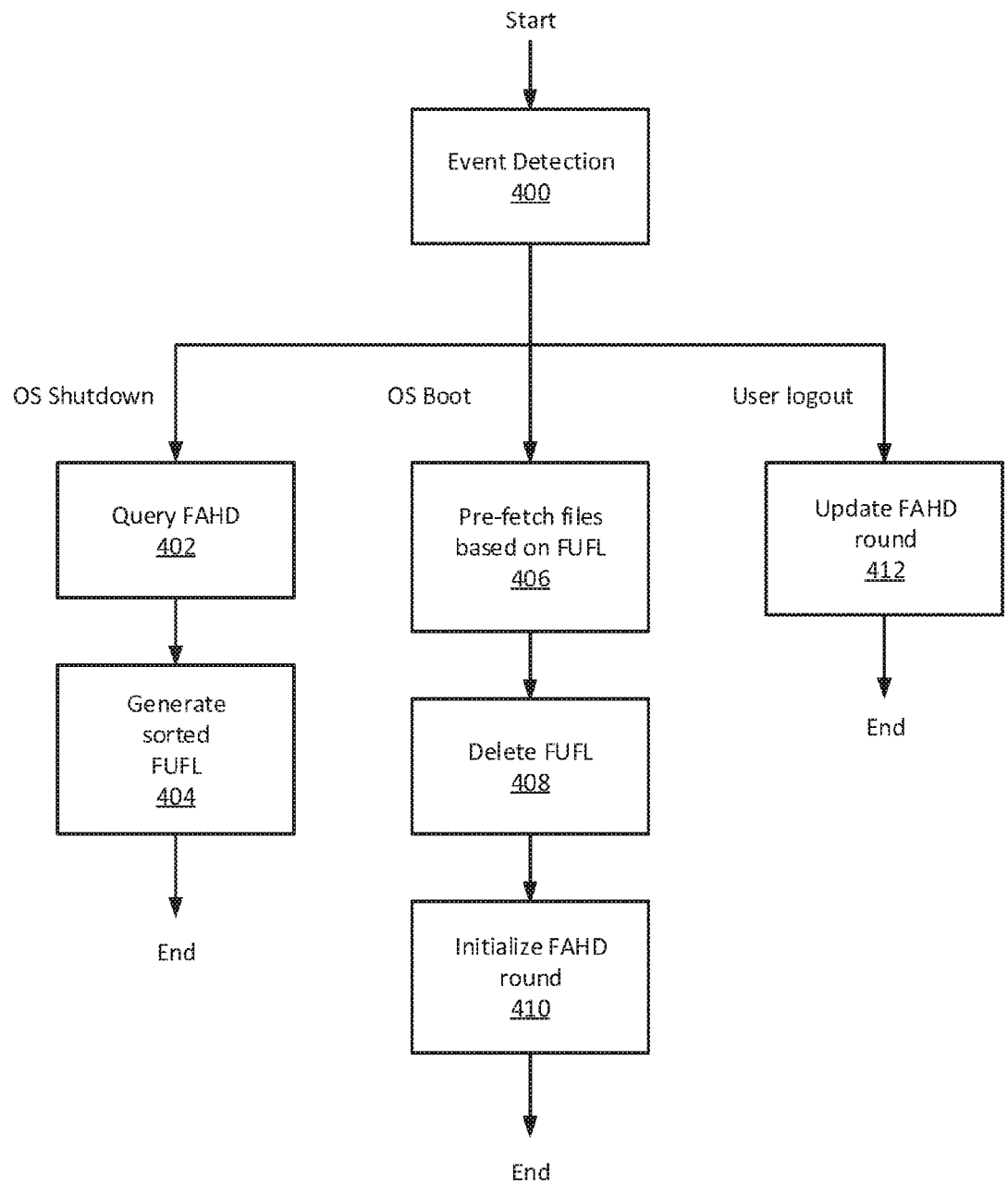
FIG. 4 is a flowchart illustrating a process for cache memory pre-fetch, in accordance with certain embodiments of the present disclosure
Figure 5:
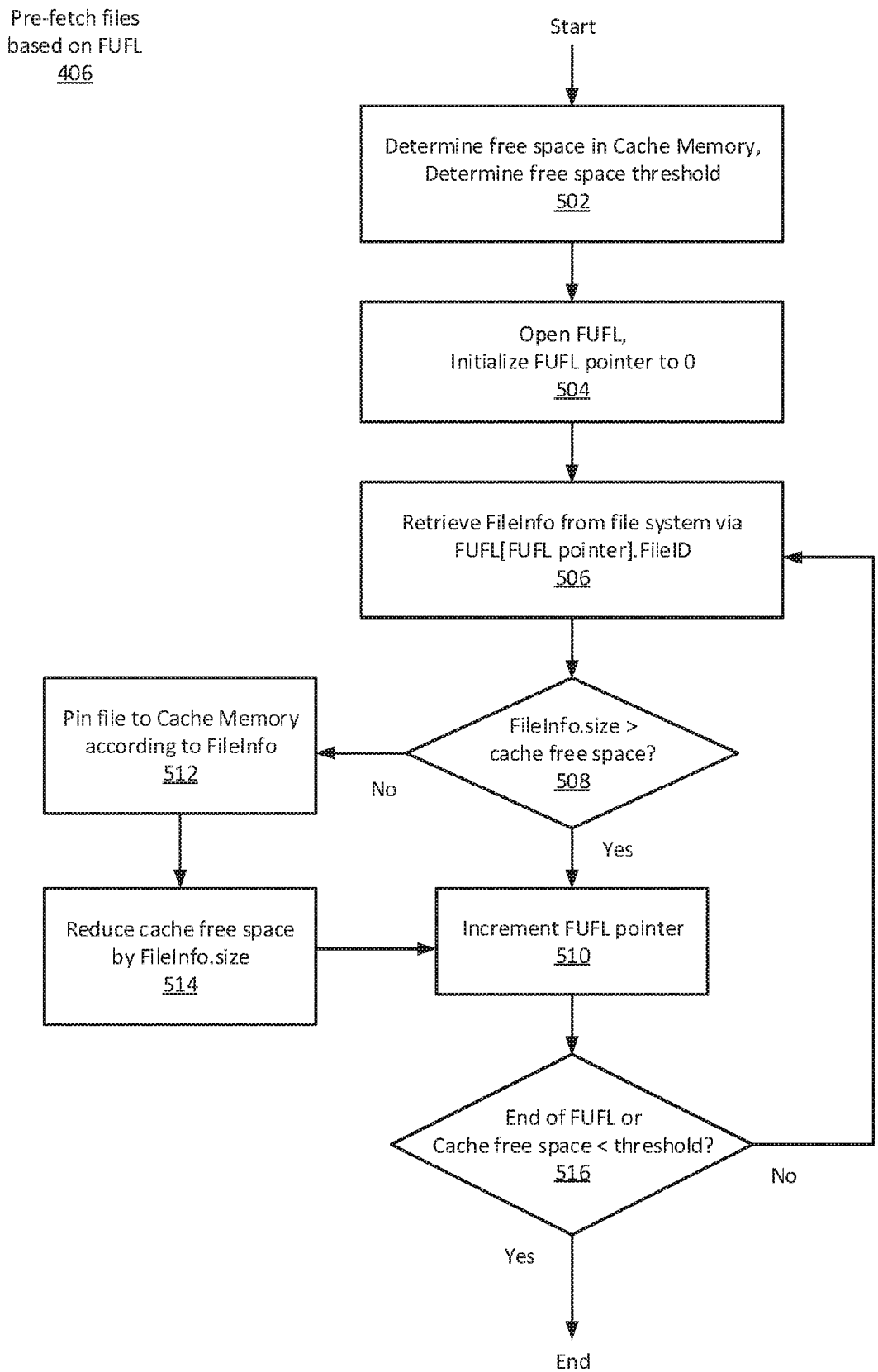
FIG. 5 is a flowchart illustrating a process for file pre-fetch based on a frequently used file list (FUFL), in accordance with certain embodiments of the present disclosure.
Figure 6:
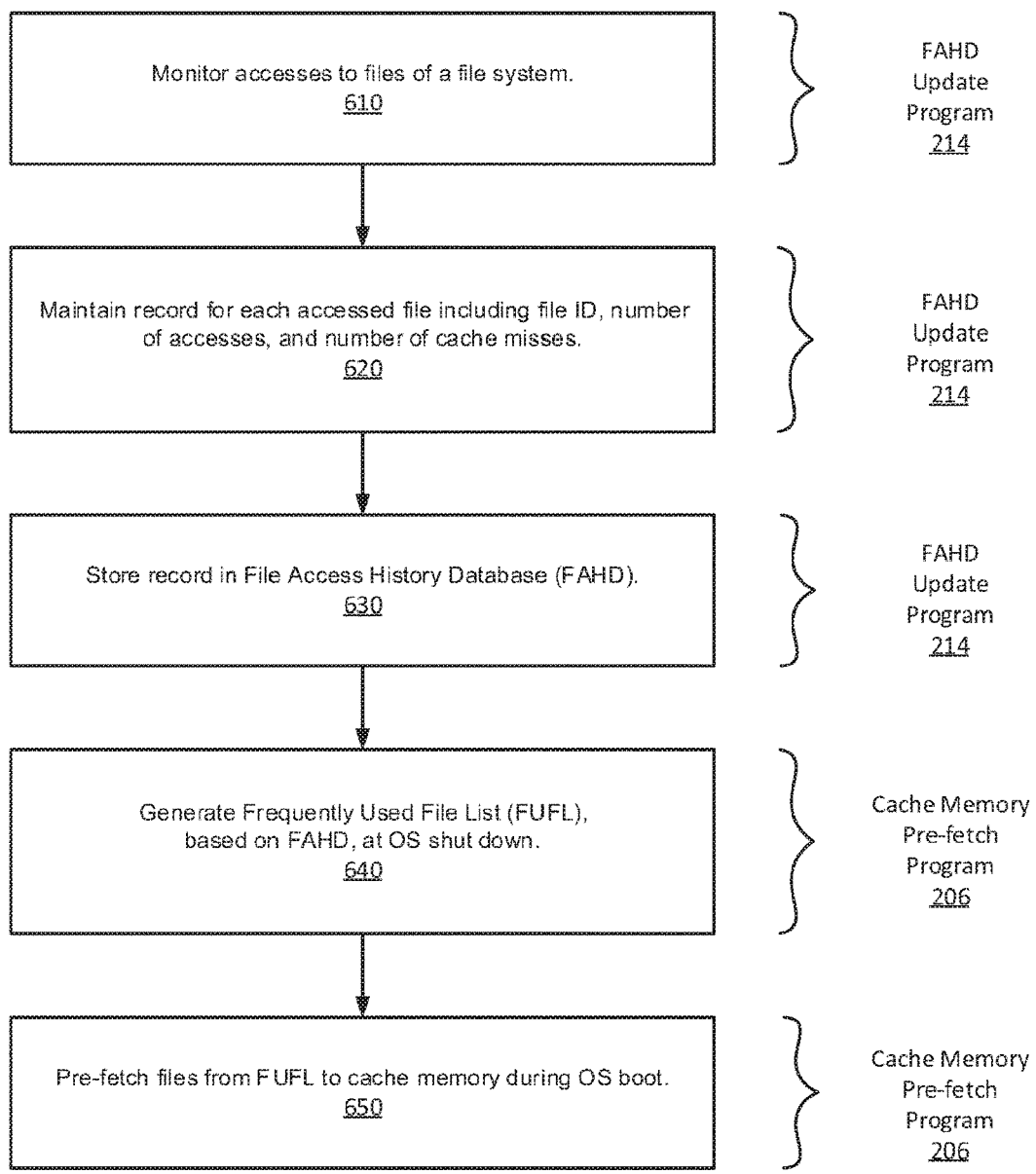
FIG. 6 is a flowchart illustrating a process for file pre-fetch scheduling, in accordance with certain embodiments of the present disclosure.

FIGS. 4-6 are flowcharts illustrating example processes associated with aspects of the scheduling of file pre-fetches from a file system into a cache memory, in accordance with certain embodiments of the present disclosure. As can be seen, the example methods include a number of phases and sub-processes, the sequence of which may vary from one embodiment to another. However, when considered in the aggregate, these phases and sub-processes form a process for file pre-fetch scheduling in accordance with certain of the embodiments disclosed herein. These embodiments can be implemented, for example using the system architecture illustrated in FIGS. 1 and 2, as described above. However other system architectures can be used in other embodiments, as will be apparent in light of this disclosure. To this end, the correlation of the various functions shown in FIGS. 4-6 to the specific components illustrated in the other figures is not intended to imply any structural and/or use limitations. Rather, other embodiments may include, for example, varying degrees of integration wherein multiple functionalities are effectively performed by one system. For example, in an alternative embodiment a single module having decoupled sub-modules can be used to perform all of the functions of these methods. Thus, other embodiments may have fewer or more modules and/or sub-modules depending on the granularity of implementation. In still other embodiments, the process depicted can be implemented as a computer program product including one or more non-transitory machine readable mediums that when executed by one or more processors cause the process to be carried out. Numerous variations and alternative configurations will be apparent in light of this disclosure.

FIG. 4 is a flowchart illustrating an example process for cache memory pre-fetch 206, in accordance with certain embodiments of the present disclosure. At operation 400, an event is detected and identified as one of an OS shutdown, an OS boot, or a user logout. At operation 402, in response to the identification of an OS shutdown, the FAHD is queried, and at operation 404 the FUFL is generated based on the contents of the FAHD. Thus, the FAHD may be configured to capture file access information during a time period that extends up to and including the completion of execution of user mode applications. In some embodiments, file identifications from the FAHD are sorted into the FUFL and a selected subset (e.g., the N most accesses files and/or most cache missed files) are retained.

At operation 406, in response to the identification of an OS boot, files identified by the FUFL are pre-fetched from the file system to the cache memory, as described in greater detail below in connection with FIG. 5. At operation 408, the FUFL is deleted and at operation 410, the FAHD is initialized to the first round. Thus, the FAHD may be configured to capture file access information during a time period that begins prior to the execution of user mode applications. At operation 412, in response to the identification of a user logout, the FAHD round is updated so that a new round of file accesses statistics will be collected.

FIG. 5 is a flowchart illustrating an example process 406 for file pre-fetch based on the FUFL, in accordance with certain embodiments of the present disclosure. At operation 502, a determination is made as to the amount of free space available in the cache memory 104. A free space threshold is also selected or determined. The threshold to specifies a desired lower limit on cache memory free space. At operation 504, the FUFL is opened and an FUFL pointer is initialized zero. Next, at operation 506, file information is retrieved from the file system using the file ID, from the FUFL, at the current pointer (e.g., FUFL[FUFL pointer] .FileID). At operation 508, the size of the file, obtained from the retrieved file information, is compared to the cache memory free space. If the file will fit in the cache, then at operation 512, the file is pinned to the cache, for example by copying the file content associated with the file ID, from the HDD into the cache memory. At operation 514, the cache free space is reduced by the size of the file being pinned. At operation 510 the FUFL pointer is incremented. At operation 516, if the end of the FUFL has been reached or if the cache free space has fallen below the threshold, the process is completed. Otherwise, the process continues at operation 506 with the retrieval of the next file listed in the FUFL.

FIG. 6 is a flowchart illustrating an example process 600 for scheduling of file pre-fetches from a file system into a cache memory, in accordance with certain embodiments of the present disclosure. Process 600 for file pre-fetch scheduling commences, at operation 610, by monitoring accesses to files of a file system. File accesses include file open operations and file reading operations. In some embodiments, the file system is stored on a hard disk drive.

Next, at operation 620, a record for each of the accessed files is maintained. The record includes an identifier of the file, a number of accesses of the file, and a number of cache memory misses associated with the accesses of the file. In some embodiments, the record may capture file accesses and cache memory misses over a selected period of time, such as, for example a given number of user login/logout cycles or other chosen sequence of events or durations. In some embodiments, the cache memory is a non-volatile memory such as, for example, a solid-state drive.

At operation 630, the record is stored into a file access history database (FAHD). When the file is deleted from the file system, the associated record of that file in the FAHD may also be deleted.

At operation 640, a frequently used file list (FUFL) is generated in response to an OS shut down. The FUFL is based on the FAHD. In some embodiments, files from the FAHD are sorted into the FUFL, using the number of access of the file as a major sorting key and using the number of cache memory misses as a minor sorting key. A subset of the sorted files (e.g., all, or a selected portion) may then be retained in the FUFL. Thus, the FUFL may be configured to include the most accessed files with the most cache memory misses.

At operation 650, files listed in the FUFL are pre-fetched from the file system to the cache memory during an OS boot to reduce subsequent access latency to those files. The FUFL may then be deleted after the file pre-fetches are performed.

Of course, in some embodiments, additional operations may be performed, as previously described in connection with the system. For example, the disclosed techniques, referred to as smart file pinning, may be combined with a combination of hard file pinning and soft file techniques. In such cases, the hard-pinned files are given the highest priority for pre-fetching, while the soft-pinned files are given a medium priority, and the smart-pinned files are given the lowest priority.

Integration with Hard and Soft File Pinning Processes

Figure 7:
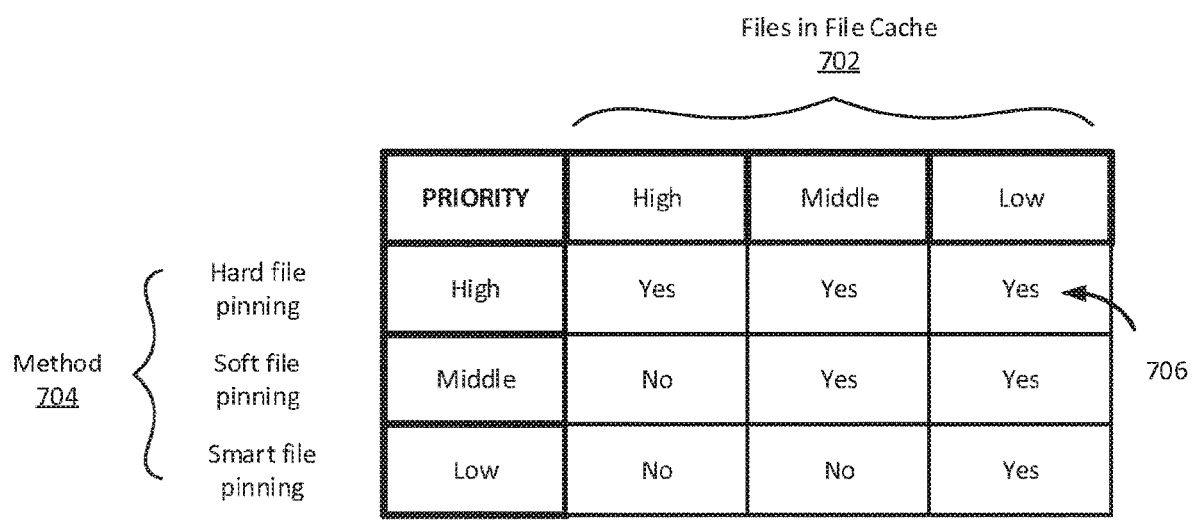
FIG. 7 is a table illustrating file pinning prioritization, in accordance with certain embodiments of the present disclosure.

FIG. 7 is a table 700 illustrating file pinning prioritization, in accordance with certain embodiments of the present disclosure. As previously discussed, the disclosed techniques for smart file pinning may be employed in combination with hard file pinning and soft file pinning procedures. In such cases, the prioritization that determines which files will be pre-fetched into the cache memory is set out in table 700 which lists file pinning methods 704 versus priority of files in cache 702. In particular, files that are specified through hard file pinning are given the highest priority, files that are specified through soft file pinning are given a medium priority, and files that are identified through smart file pinning are given the lowest priority. In some embodiments, this may be accomplished by performing the hard file pinning first, followed by the soft file pinning, followed by the smart file pinning. Thus, if space in the cache memory runs low as files are pre-fetched, files that are identified through smart file pinning may not be stored in the cache memory. This ensures that files which are specifically identified by the user and/or the software vendor for lowest latency access have the best chance of being stored in the cache memory. Additionally, in some embodiments, files may be swapped in and out of the memory cache according to the priorities set out in table 700. Thus, a smart pinned file may be swapped out for a hard pinned file as indicated by the "yes" entry 706 in the table.

Example System

Figure 8:
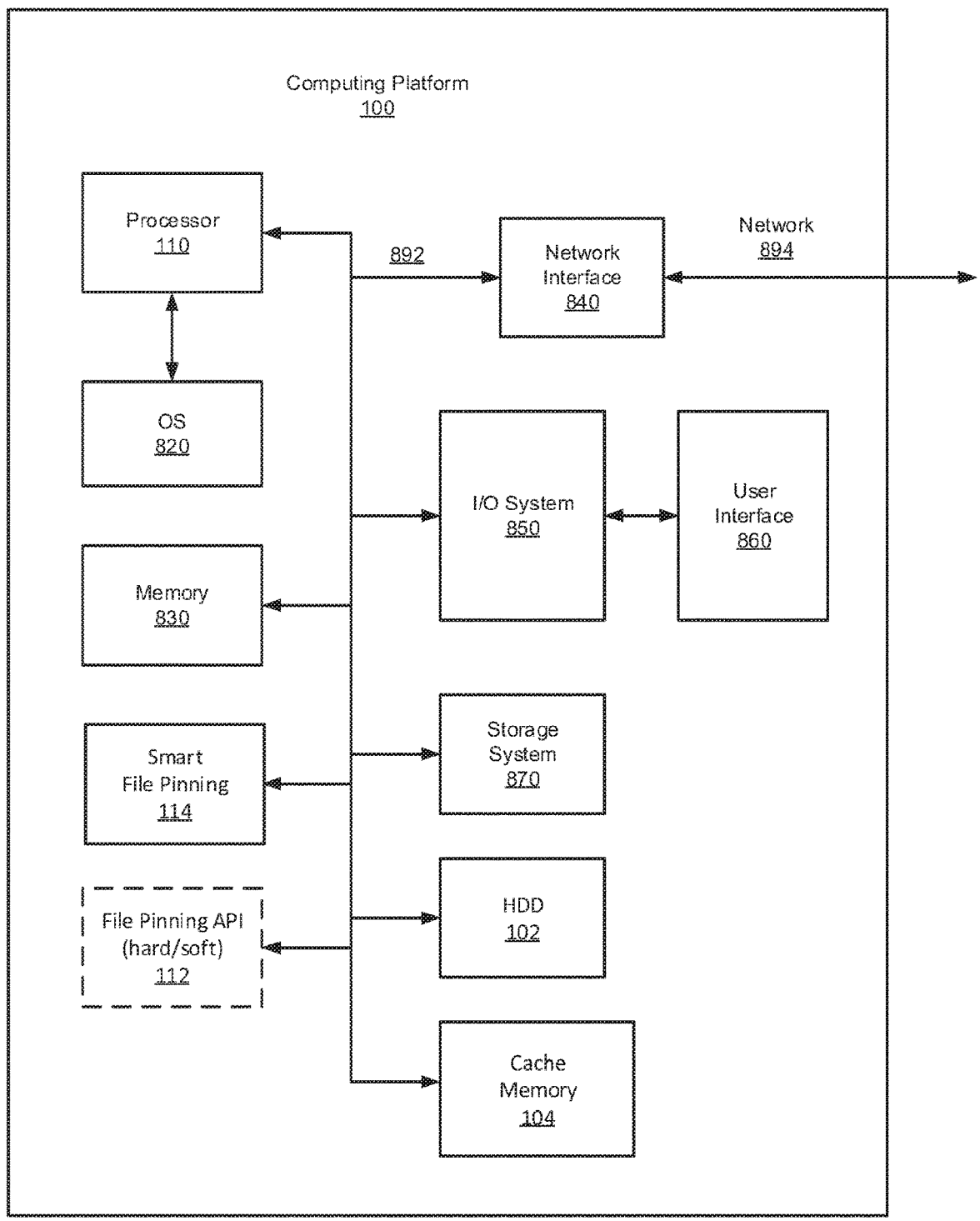
FIG. 8 is a block diagram schematically illustrating a computing system to employ file pre-fetch scheduling, in accordance with certain embodiments of the present disclosure.

FIG. 8 illustrates an example computing system 800 employing file pre-fetch scheduling, configured in accordance with certain embodiments of the present disclosure. In some embodiments, system 800 comprises the computing platform 100 which may host, or otherwise be incorporated into a personal computer, workstation, server system, laptop computer, ultra-laptop computer, portable computer, and so forth. Any combination of different devices may be used in certain embodiments.

In some embodiments, platform 100 may comprise any combination of a processor 110, a memory 830, smart file pinning system 114, file pinning API 112 (optional), a network interface 840, an input/output (I/O) system 850, a user interface 860, a storage system 870, a hard disk drive (HDD) 870, and a cache memory 104. As can be further seen, a bus and/or interconnect 892 is also provided to allow for communication between the various components listed above and/or other components not shown. Platform 100 can be coupled to a network 894 through network interface 840 to allow for communications with other computing devices, platforms, or resources. Other componentry and functionality not reflected in the block diagram of FIG. 8 will be apparent in light of this disclosure, and it will be appreciated that other embodiments are not limited to any particular hardware configuration.

Processor 110 can be any suitable processor, and may include one or more coprocessors or controllers, such as a graphics processing unit, an audio processor, or hardware accelerator, to assist in control and processing operations associated with system 800. In some embodiments, the processor 110 may be implemented as any number of processor cores. The processor (or processor cores) may be any type of processor, such as, for example, a microprocessor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 110 may be implemented as a complex instruction set computer (CISC) or a reduced instruction set computer (RISC) processor. In some embodiments, processor 110 may be configured as an x86 instruction set compatible processor.

Memory 830 can be implemented using any suitable type of digital storage including, for example, flash memory and/or random access memory (RAM). In some embodiments, the memory 830 may include various layers of memory hierarchy and/or memory caches as are known to those of skill in the art. Memory 830 may be implemented as a volatile memory device such as, but not limited to, a RAM, dynamic RAM (DRAM), or static RAM (SRAM) device. Storage system 870 may be implemented as a non-volatile storage device such as, but not limited to, one or more of a hard disk drive (HDD) 102, a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 870 may comprise technology to increase the storage performance enhanced protection for valuable digital media when multiple hard drives are included. Cache memory 104 may be configured as an intermediate memory system between memory 830 and HDD 102 to store frequently accessed files and provide reduced access latency to those files, as previously described. In some embodiments, cache memory 104 may be a non-volatile memory such as, for example a solid state drive.

Processor 110 may be configured to execute an Operating System (OS) 820 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), Linux, a real-time operating system (RTOS), or any variants thereof. As will be appreciated in light of this disclosure, the techniques provided herein can be implemented without regard to the particular operating system provided in conjunction with system 800, and therefore may also be implemented using any suitable existing or subsequently-developed platform.

Network interface circuit 840 can be any appropriate network chip or chipset which allows for wired and/or wireless connection between other components of computer system 800 and/or network 894, thereby enabling system 800 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 850 may be configured to interface between various I/O devices and other components of computer system 800. I/O devices may include, but not be limited to, a user interface 860. User interface 860 may include devices (not shown) such as a display element, touchpad, keyboard, mouse, microphone, and speaker, etc. I/O system 850 may include a graphics subsystem configured to perform processing of images for rendering on a display element. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 110 or any chipset of platform 100.

It will be appreciated that in some embodiments, the various components of the system 800 may be combined or integrated in a system-on-a-chip (SoC) architecture. In some embodiments, the components may be hardware components, firmware components, software components or any suitable combination of hardware, firmware or software.

Smart file pinning module 114 is configured to schedule file pre-fetches from a file system, stored on HDD 102 or other storage system 870, into cache memory 104, to reduce subsequent latency associated with future accesses to those files, as described previously. Smart file pinning module 114 may include any or all of the circuits/programs/components illustrated in FIG. 2, including cache memory pre-fetch program 206, frequently used file list 208, file access history database update program 214, and file access history database 218, as described above. These components can be implemented or otherwise used in conjunction with a variety of suitable software and/or hardware that is coupled to or that otherwise forms a part of platform 100. These components can additionally or alternatively be implemented or otherwise used in conjunction with user I/O devices that are capable of providing information to, and receiving information and commands from, a user. In some cases, access to resources on a given network or computing system may require credentials such as usernames, passwords, and/or compliance with any other suitable security mechanism.

In various embodiments, system 800 may be implemented as a wireless system, a wired system, or a combination of both. When implemented as a wireless system, system 800 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 800 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the file pre-fetch methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given web site and implemented, for example, using JavaScript or another suitable browser-based technology. For instance, in certain embodiments, the system may leverage processing resources provided by a remote computer system accessible via network 894. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments system 800 may comprise additional, fewer, or alternative subcomponents as compared to those included in the example embodiment of FIG. 8.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform methods and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smart phones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a processor-implemented method for file pre-fetch scheduling, the method comprising: monitoring, by a processor-based system, accesses to files of a file system; maintaining, by the processor-based system, a record for each of the accessed files, the record comprising an identifier of the file, a number of accesses of the file, and a number of cache memory misses associated with the accesses of the file; storing, by the processor-based system, the record into a file access history database (FAHD); generating, by the processor-based system, in response to an Operating System (OS) shutdown, a frequently used file list (FUFL) based on the FAHD; and pre-fetching, by the processor-based system, in response to an OS boot, files identified by the FUFL to the cache memory.

Example 2 includes the subject matter of Example 1, wherein the generating of the FUFL further comprises sorting the FUFL using the number of access of the file as a major sorting key and using the number of cache memory misses as a minor sorting key, and preserving a selected subset of the sorted FUFL.

Example 3 includes the subject matter of Examples 1 or 2, further comprising deleting the FUFL after performing the pre-fetching.

Example 4 includes the subject matter of any of Examples 1-3, wherein the number of accesses of the file and the number of cache memory misses associated with the accesses of the file are maintained in the record over a period of time associated with a selected number of user login/logout cycles.

Example 5 includes the subject matter of any of Examples 1-4, wherein the file system is stored on a hard disk drive and the cache memory is a non-volatile memory.

Example 6 includes the subject matter of any of Examples 1-5, wherein the pre-fetching further comprises pre-fetching files selected through at least one of a hard file pinning process, at a first priority, and a soft file pinning process, at a second priority, wherein the first priority is higher than the second priority, and the second priority is higher than a third priority associated with the files pre-fetched from the FUFL.

Example 7 includes the subject matter of any of Examples 1-6, wherein the accesses of the files of the file system include at least one of a file open operation and a file read operation.

Example 8 includes the subject matter of any of Examples 1-7, further comprising removing the stored record associated with a deleted file from the FAHD in response to detecting a deletion of the accessed file from the file system.

Example 9 includes the subject matter of any of Examples 1-8, further comprising accessing, by a software application, a pre-fetched file from the cache memory.

Example 10 is a system for file pre-fetch scheduling, the system comprising: a file system; a cache memory; a file access history database (FAHD) update program to: monitor accesses to files of the file system; maintain a record for each of the accessed files, the record comprising an identifier of the file, a number of accesses of the file, and a number of cache memory misses associated with the accesses of the file; and store the record into the FAHD; and a cache memory pre-fetch program to: generate, in response to an Operating System (OS) shutdown, a frequently used file list (FUFL) based on the FAHD; and pre-fetch, in response to an OS boot, files identified by the FUFL to the cache memory.

Example 11 includes the subject matter of Example 10, wherein the cache memory pre-fetch program is further to sort the FUFL using the number of access of the file as a major sorting key and using the number of cache memory misses as a minor sorting key, and preserve a selected subset of the sorted FUFL.

Example 12 includes the subject matter of Examples 10 or 11, wherein the cache memory pre-fetch program is further to delete the FUFL after performing the pre-fetching.

Example 13 includes the subject matter of any of Examples 10-12, wherein the FAHD update program is further to maintain the number of accesses of the file, and the number of cache memory misses associated with the accesses of the file, in the record over a period of time associated with a selected number of user login/logout cycles.

Example 14 includes the subject matter of any of Examples 10-13, further comprising a hard disk drive, wherein the file system is stored on the hard disk drive and the cache memory is a non-volatile memory.

Example 15 includes the subject matter of any of Examples 10-14, wherein the cache memory pre-fetch program is further to pre-fetch files selected through at least one of a hard file pinning process, at a first priority, and a soft file pinning, at a second priority, wherein the first priority is higher than the second priority, and the second priority is higher than a third priority associated with the files pre-fetched from the FUFL.

Example 16 includes the subject matter of any of Examples 10-15, wherein the accesses of the files of the file system include at least one of a file open operation and a file read operation.

Example 17 includes the subject matter of any of Examples 10-16, wherein the FAHD update program is further to remove the stored record associated with a deleted file from the FAHD, in response to detecting a deletion of the accessed file from the file system.

Example 18 is at least one non-transitory computer readable storage medium having instructions encoded thereon that, when executed by one or more processors, result in the following operations for file pre-fetch scheduling, the operations comprising: monitoring accesses to files of a file system; maintaining a record for each of the accessed files, the record comprising an identifier of the file, a number of accesses of the file, and a number of cache memory misses associated with the accesses of the file; storing the record into a file access history database (FAHD); generating, in response to an Operating System (OS) shutdown, a frequently used file list (FUFL) based on the FAHD; and pre-fetching, in response to an OS boot, files identified by the FUFL to the cache memory.

Example 19 includes the subject matter of Example 18, wherein the generating of the FUFL further comprises the operations of sorting the FUFL using the number of access of the file as a major sorting key and using the number of cache memory misses as a minor sorting key, and preserving a selected subset of the sorted FUFL.

Example 20 includes the subject matter of Examples 18 or 19, further comprising the operation of deleting the FUFL after performing the pre-fetching.

Example 21 includes the subject matter of any of Examples 18-20, wherein the number of accesses of the file and the number of cache memory misses associated with the accesses of the file are maintained in the record over a period of time associated with a selected number of user login/logout cycles.

Example 22 includes the subject matter of any of Examples 18-21, wherein the file system is stored on a hard disk drive and the cache memory is a non-volatile memory.

Example 23 includes the subject matter of any of Examples 18-22, wherein the pre-fetching further comprises the operation of pre-fetching files selected through at least one of a hard file pinning process, at a first priority, and a soft file pinning process, at a second priority, wherein the first priority is higher than the second priority, and the second priority is higher than a third priority associated with the files pre-fetched from the FUFL.

Example 24 includes the subject matter of any of Examples 18-23, wherein the accesses of the files of the file system include at least one of a file open operation and a file read operation.

Example 25 includes the subject matter of any of Examples 18-24, further comprising the operation of removing the stored record associated with a deleted file from the FAHD in response to detecting a deletion of the accessed file from the file system.

Example 26 is a system for file pre-fetch scheduling, the system comprising: means for monitoring accesses to files of a file system; means for maintaining a record for each of the accessed files, the record comprising an identifier of the file, a number of accesses of the file, and a number of cache memory misses associated with the accesses of the file; means for storing the record into a file access history database (FAHD); means for generating, in response to an Operating System (OS) shutdown, a frequently used file list (FUFL) based on the FAHD; and means for pre-fetching, in response to an OS boot, files identified by the FUFL to the cache memory.

Example 27 includes the subject matter of Example 26, wherein the generating of the FUFL further comprises means for sorting the FUFL using the number of access of the file as a major sorting key and using the number of cache memory misses as a minor sorting key, and preserving a selected subset of the sorted FUFL.

Example 28 includes the subject matter of Examples 26 or 27, further comprising means for deleting the FUFL after performing the pre-fetching.

Example 29 includes the subject matter of any of Examples 26-28, wherein the number of accesses of the file and the number of cache memory misses associated with the accesses of the file are maintained in the record over a period of time associated with a selected number of user login/logout cycles.

Example 30 includes the subject matter of any of Examples 26-29, wherein the file system is stored on a hard disk drive and the cache memory is a non-volatile memory.

Example 31 includes the subject matter of any of Examples 26-30, wherein the pre-fetching further comprises means for pre-fetching files selected through at least one of a hard file pinning, at a first priority, and a soft file pinning process, at a second priority, wherein the first priority is higher than the second priority, and the second priority is higher than a third priority associated with the files pre-fetched from the FUFL.

Example 32 includes the subject matter of any of Examples 26-31, wherein the accesses of the files of the file system include at least one of a file open operation and a file read operation.

Example 33 includes the subject matter of any of Examples 26-32, further comprising means for removing the stored record associated with a deleted file from the FAHD in response to detecting a deletion of the accessed file from the file system.

Example 34 includes the subject matter of any of Examples 26-33, further comprising means for accessing, by a software application, a pre-fetched file from the cache memory.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A computer-implemented method for file pre-fetch scheduling, the method comprising:
    monitoring, by a computer processor, accesses to files of a file system;
    maintaining, by the computer processor, a record for each of the accessed files, the record comprising an identifier of the file, a number of accesses of the file, and a number of cache memory misses associated with the accesses of the file;
    storing, by the computer processor, the record of each of the accessed files into a database;
    generating, by the computer processor, in response to a shutdown command, a list of frequently used files based on the database, wherein the generating of the list comprises sorting the list using the number of accesses of the file and using the number of cache memory misses; and
    pre-fetching, by the computer processor system, in response to a boot command, files identified by the list to the cache memory.

2. The method of claim 1, wherein the generating of the list comprises preserving a selected subset of the sorted list.

3. The method of claim 1, further comprising deleting the list after performing the pre-fetching.

4. The method of claim 1, wherein the number of accesses of the file and the number of cache memory misses associated with the accesses of the file are maintained in the record over a period of time associated with a selected number of user login/logout cycles.

5. The method of any of claim 1, wherein the pre-fetching further comprises pre-fetching files selected through at least one of a hard file pinning process, at a first priority, and a soft file pinning process, at a second priority, wherein the first priority is higher than the second priority, and the second priority is higher than a third priority associated with the files pre-fetched from the list.

6. The method of any of claim 1, wherein the accesses of the files of the file system include at least one of a file open operation and a file read operation.

7. The method of any of claim 1, further comprising one or both of:
    removing the stored record associated with a deleted file from the database in response to detecting a deletion of the accessed file from the file system; and/or
    accessing, by a software application, a pre-fetched file from the cache memory.

8. A system for file pre-fetch scheduling, the system comprising:
    a file system comprising a plurality of files;
    a cache memory;
    a database update program to:
        monitor accesses to the plurality of the files of the file system;
        maintain a record for each of the accessed files, the record comprising an identifier of the file, a number of accesses of the file, and a number of cache memory misses associated with the accesses of the file; and
        store the record into the database; and
    a cache memory pre-fetch program to:
        generate, in response to a shutdown command, a list of frequently used files list (FUFL) based on the database,
        sort the list using the number of accesses of the file and using the number of cache memory misses; and
        pre-fetch, in response to a boot command, files identified by the list to the cache memory.

9. The system of claim 8, wherein the cache memory pre-fetch program is further to one or more of:
    preserve a selected subset of the sorted list;
    delete the list after performing the pre-fetching; and/or
    pre-fetch files selected through at least one of a hard file pinning process, at a first priority, and a soft file pinning process, at a second priority, wherein the first priority is higher than the second priority, and the second priority is higher than a third priority associated with the files pre-fetched from the list.

10. The system of claim 8, wherein the database update program is further to one or more of:
    maintain the number of accesses of the file, and the number of cache memory misses associated with the accesses of the file, in the record over a period of time associated with a selected number of user login/logout cycles; and/or
    remove the stored record associated with a deleted file from the database, in response to detecting a deletion of the accessed file from the file system.

11. The system of claim 8, further comprising a hard disk drive, wherein the file system is stored on the hard disk drive and the cache memory is a non-volatile memory.

12. The system of claim 8, wherein the accesses of the files of the file system include at least one of a file open operation and a file read operation.

13. At least one non-transitory, computer-readable storage medium having
    instructions encoded thereon that, when executed by one or more processors, result in the following operations for file pre-fetch scheduling, the operations comprising:
    monitoring accesses to files of a file system;
    maintaining a record for each of the accessed files, the record comprising an identifier of the file, a number of accesses of the file, and a number of cache memory misses associated with the accesses of the file;

storing the record of each of the accessed files into a database;

generating, in response to a shutdown command, a list of frequently used files list (FUFL) based on the database, wherein the generating of the list comprises sorting the list using the number of accesses of the file and using the number of cache memory misses; and pre-fetching, in response to a boot command, files identified by the list to the cache memory.

14. The computer-readable storage medium of claim 13, wherein the generating of the list comprises preserving a selected subset of the sorted list.

15. The computer-readable storage medium of claim 13, further comprising the operation of deleting the list after performing the pre-fetching.

16. The computer-readable storage medium of claim 13, wherein the number of accesses of the file and the number of cache memory misses associated with the accesses of the file are maintained in the record over a period of time associated with a selected number of user login/logout cycles.

17. The computer-readable storage medium of claim 13, wherein the file system is stored on a hard disk drive and the cache memory is a non-volatile memory.

18. The computer-readable storage medium of claim 13, wherein the pre-fetching further comprises the operation of pre-fetching files selected through at least one of a hard file pinning process, at a first priority, and a soft file pinning process, at a second priority, wherein the first priority is higher than the second priority, and the second priority is higher than a third priority associated with the files pre-fetched from the list.

19. The computer-readable storage medium claim 13, wherein the accesses of the files of the file system include at least one of a file open operation and a file read operation.

20. The computer-readable storage medium of claim 13, further comprising the operation of removing the stored record associated with a deleted file from the database in response to detecting a deletion of the accessed file from the file system.

* * * * *